(12) United States Patent
Austrheim et al.

(10) Patent No.: US 12,409,352 B2
(45) Date of Patent: Sep. 9, 2025

(54) AUTOMATED STORAGE AND RETRIEVAL SYSTEM WITH FIRE DETECTION DEVICE AND METHODS OF LOCATING AND/OR VERIFYING FIRE OR SMOKE IN AN AUTOMATED STORAGE AND RETRIEVAL SYSTEM

(71) Applicant: Autostore Technology AS, Nedre Vats (NO)

(72) Inventors: Trond Austrheim, Etne (NO); Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 726 days.

(21) Appl. No.: 17/605,432

(22) PCT Filed: Apr. 6, 2020

(86) PCT No.: PCT/EP2020/059819
§ 371 (c)(1),
(2) Date: Oct. 21, 2021

(87) PCT Pub. No.: WO2020/216608
PCT Pub. Date: Oct. 29, 2020

(65) Prior Publication Data
US 2022/0241627 A1     Aug. 4, 2022

(30) Foreign Application Priority Data
Apr. 25, 2019 (NO) .................... 20190546

(51) Int. Cl.
*A62C 3/00* (2006.01)
*B65G 1/04* (2006.01)
(52) U.S. Cl.
CPC ............ *A62C 3/002* (2013.01); *B65G 1/0464* (2013.01)

(58) Field of Classification Search
CPC .. B65G 1/0492; B65G 2207/22; B65G 1/065; A62C 3/002; A62C 27/00; A62C 2/00; G06Q 10/08
See application file for complete search history.

(56) References Cited

U.S. PATENT DOCUMENTS

2017/0267452 A1* 9/2017 Goren ................. B65G 1/0492
2019/0022441 A1* 1/2019 Konduri .............. G05D 1/0094
(Continued)

FOREIGN PATENT DOCUMENTS

CN   202189434 U    4/2012
CN   107341947 A    11/2017
(Continued)

OTHER PUBLICATIONS

Office Action issued in counterpart Chinese Application No. 2020800309377 mailed on Feb. 22, 2024 (15 pages).
(Continued)

*Primary Examiner* — Timothy R Waggoner
(74) *Attorney, Agent, or Firm* — Baker Botts L.L.P.

(57) ABSTRACT

An automated storage and retrieval system includes a rail system, a master control system, and a plurality of remotely operated vehicles. The rail system includes a first and second set of parallel tracks arranged orthogonally in a horizontal plane. The master control system is configured to keep track of any remotely operated vehicle operating on the rail system. The plurality of remotely operated vehicles handling storage containers, which operate on the rail system, each include first and second sets of wheels for transport on the rail system, and a fire detection device configured to transmit data from the fire detection device to the master control system. The master control system includes a processing
(Continued)

device for processing the data from the fire detection devices so as to create a heat map of the automated storage and retrieval system.

15 Claims, 9 Drawing Sheets

(56) References Cited

U.S. PATENT DOCUMENTS

| | | | |
|---|---|---|---|
| 2019/0233213 A1* | 8/2019 | Phan-Quiroga | B65G 1/0492 |
| 2019/0240517 A1* | 8/2019 | Clarke | B65G 1/0464 |
| 2019/0294165 A1* | 9/2019 | Hofmann | A62C 3/0221 |
| 2019/0375588 A1* | 12/2019 | Lindbo | B65G 1/0464 |

FOREIGN PATENT DOCUMENTS

| | | |
|---|---|---|
| CN | 109230148 A | 1/2019 |
| JP | H09-221201 A | 8/1997 |
| JP | H09226909 A | 9/1997 |
| JP | 2018-514483 A | 6/2018 |
| NO | 317366 B1 | 10/2004 |
| WO | 2005010842 A1 | 2/2005 |
| WO | 2014075937 A1 | 5/2014 |
| WO | 2014090684 A1 | 6/2014 |
| WO | 2015193278 A1 | 12/2015 |
| WO | 2016/166353 A1 | 10/2016 |
| WO | 2016198467 A1 | 12/2016 |
| WO | 2017148963 A1 | 9/2017 |

OTHER PUBLICATIONS

Office Action issued in counterpart Japanese Application No. 2021-563016 mailed on Jan. 29, 2024 (5 pages).

J. Lenchner et al. "Towards Data Center Self-Diagnosis Using a Mobile Robot" Jan. 1, 2011; Retrieved from the Internet: URL:<https://www.researchgate.net/publication/221210942_Towards_data_center_self-diagnosis_using_a_mobile_robot> (11 pages).

International Search Report issued in International Application No. PCT/EP2020/059819, mailed May 13, 2020 (4 pages).

Written Opinion issued in International Application No. PCT/EP2020/059819; Dated May 13, 2020 (7pages).

International Preliminary Report on Patentability issued in International Application No. PCT/EP2020/059819; mailed Jun. 25, 2021 (16 pages).

Office Action issued in Norwegian Application No. 20190546; Dated Nov. 20, 2019 (2 pages).

Hirokazu Moribayashi, Notice of Final Rejection for Japanese Patent Application No. P2021-563016, dated May 14, 2023, 5 pages, pub. by Japanese Patent Office.

Anonymous, First Office Action for Chinese Patent Application No. 202080030937.7, dated Jan. 14, 2025, 4 pages, pub. by SIPO, Beijing, China.

Dedek, Frederic, Extended European Search Report for European Patent Application No. 24196585.4, dated Feb. 17, 2025, 9 pages, pub. by the EPO, Munich, Germany.

Satya Veera Pavan Kumar Maddukuri et al, "A Low Cost Sensor Based Autonomous and Semi•Autonomous Fire-Fighting Squad Robot," Dec. 16, 2016, 2016 Sixth International Symposium on Embedded Computing and System Design (ISED), pp. 279-283, XP033117245, 5 pages.

M.L. NG, Requisition by examiner (Office action), pub. by Canadian Intellectual Property Office, Gatineau, Quebec, Mar. 27, 2025, 5 pages [all internally cited documents D1, D2, D3 have been previously cited and considered in this case].

\* cited by examiner
AUTOMATED STORAGE AND RETRIEVAL SYSTEM WITH FIRE DETECTION DEVICE AND METHODS OF LOCATING AND/OR VERIFYING FIRE OR SMOKE IN AN AUTOMATED STORAGE AND RETRIEVAL SYSTEM The present invention relates to an automated storage and retrieval system with fire detection device and methods of locating and/or verifying fire or smoke in an automated storage and retrieval system.

BACKGROUND AND PRIOR ART

FIGS. 1A and 1C disclose a typical prior art automated storage and retrieval system 1 with a framework structure 100. FIGS. 1B and 1D disclose prior art container handling vehicles 200, 300 operating on the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage grid 104, on which rail system 108 a plurality of container handling vehicles 200, 300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 respectively due to the horizontal extent of the rails 110, 111.

The rail system 108 comprises a first set of parallel rails 110 arranged to guide movement of the container handling vehicles 200, 300 in a first direction X across the top of the frame structure 100, and a second set of parallel rails 111 arranged perpendicular to the first set of rails 110 to guide movement of the container handling vehicles 200, 300 in a second direction Y which is perpendicular to the first direction X. In this way, the rail system 108 defines grid columns above which the container handling vehicles 200, 300 can move laterally above the storage columns 105, i.e. in a plane which is parallel to the horizontal X-Y plane.

Each prior art container handling vehicle 200, 300 comprises a vehicle body and a wheel arrangement of eight wheels 201, 301 where a first set of four wheels enable the lateral movement of the container handling vehicles 200, 300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200, 300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200, 300 so that the position of the gripping/engaging devices with respect to the vehicle 200, 300 can be adjusted in a third direction Z which is orthogonal the first direction X and the second direction Y.

Conventionally, and also for the purpose of this application, Z=1 identifies the uppermost layer of the storage grid 104, i.e. the layer immediately below the rail system 108, Z=2 the second layer below the rail system 108, Z=3 the third layer etc. In the exemplary prior art storage grid 104 disclosed in FIGS. 1A and 1C, Z=8 identifies the lowermost, bottom layer of the storage grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a container receiving space arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column, e.g. as is disclosed in WO2014/090684A1.

The rail system 108 may be a single rail (also denoted single track) system, as is shown in FIG. 2A. Alternatively, the rail system 108 may be a double rail (also denoted double track) system, as is shown in FIG. 2B, thus allowing a container handling vehicle 200 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a, 110b of the first rails 110 and a pair of rails 111a, 111b of the second set of rails 111. In FIG. 2B the grid cell 122 is indicated by a dashed box. For example, the sections of the rail-based system being made of aluminium are the rails, and on the upper surface of the rails, there are a pair of tracks that the wheels of the vehicle run in. However, the sections could be separate rails each with a track.

Consequently, rails 110a and 110b form pairs of rails defining parallel rows of grid cells running in the X direction, and rails 111a and 111b form pairs of rails defining parallel rows of grid cells running in the Y direction. Similarly, on a delivery rail system 50, rails 51a and 51b form pairs of rails defining parallel rows of grid cells running in the X direction, and rails 52a and 52b form pairs of rails defining parallel rows of grid cells running in the Y direction.

As shown in FIG. 2C, each grid cell 122 has a width $W_c$, which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$, and the length $L_c$ of the grid cell 122.

In the X and Y directions, neighboring grid cells are arranged in contact with each other such that there is no space therebetween.

In a storage grid 104, a majority of the grid columns are storage columns 105, i.e. grid columns 105 where storage containers 106 are stored in stacks 107. However, a storage grid 104 normally has at least one grid column which is used not for storing storage containers 106, but which comprises a location where the container handling vehicles 200, 300 can drop off and/or pick up storage containers 106 so that they can be transported to a second location (not shown) where the storage containers 106 can be accessed from outside of the storage grid 104 or transferred out of or into the storage grid 104. Within the art, such a location is normally referred to as a "port" and the grid column in which the port is located may be referred to as "port column" or "delivery column" 119, 120. The drop-off and pick-up ports of the rail system 108 where the container handling vehicles 200, 300 operate are referred to as the "upper ports of a delivery column" 119, 120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200, 300 can drop off storage containers 106 to be transported through the delivery column 119 and further to an access or a transfer station, and the second delivery column 120 may comprise a dedicated pick-up port where the container handling vehicles 200, 300 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200, 300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column and the access station.

If the lower port of the delivery column and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the storage grid 104 disclosed in FIG. 1A is to be accessed, one of the container handling vehicles 200, 300 is instructed to retrieve the target storage container 106 from its position in the storage grid 104 and to transport it to or through the delivery column 119. This operation involves moving the container handling vehicle 200, 300 to a grid location above the storage column 105 in which the target storage container 106 is positioned, retrieving the storage container 106 from the storage column 105 using the container handling vehicle's lifting device 16, and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200, 300 that is subsequently used for transporting the target storage container 106 to the delivery column, or with one or a plurality of other cooperating container handling vehicles 200, 300. Alternatively, or in addition, the automated storage and retrieval system 1 may have container handling vehicles 200, 300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the storage grid 104, one of the container handling vehicles 200, 300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200, 300 positions the storage container 106 at the desired position. The removed storage containers may then be lowered back into the storage column 105, or relocated to other storage columns 105.

Over the years, few attempts have been made in order to improve the fire-safety in automated storage and retrieval systems as the ones described above. However, from WO 2017148963 A1 it is known dedicated fire extinguishing service robot device on a grid. The disclosed service robot device is inactive during normal operation of the system and is only used in case of fire. The service robot device comprises fire extinguishing means and is capable of driving to any location on the grid in order to extinguish fire. Furthermore, the service robot device may comprise fire detecting means.

It is a problem with the prior art systems that they do not give the firefighting crew any information relating to where on the grid there is a heat- or fume emission.

One objective of the present invention is thus to provide a solution which provides the firefighting crew more reliable information with regards to location of any heat- or fume emission.

Another objective of the invention is to provide a solution which can verify whether a detection of heat- or fume emission is real.

SUMMARY OF THE INVENTION

The invention is set forth in the independent claims and the dependent claims describe alternatives of the invention.

It is described an automated storage and retrieval system comprising:
- a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; and
- a master control system configured to keep track of any remotely operated vehicle operating on the rail system;
- a plurality of remotely operated vehicles operating on the rail system, each of the remotely operated vehicles comprising:
    - first and second sets of wheels for transport in the X and Y directions on the rail system and
    - a fire detection device configured to transmit data from the fire detection device to the master control system.

The master control system may comprise a processing device for processing the data from the fire detection devices such as to create a heat map of the automated storage and retrieval system. This may provide valuable input to the in order to assist the firefighting crew with regards to the probable source of fire or smoke, in particular as the automated storage and retrieval systems increase in size (up to 110×150 meters and above, and with 500000 bins and more). As the warehouses where the automated storage and retrieval systems are installer are often dark due to limited requirement of light sources in the warehouse during normal operation, and that any external power sources providing the light sources with electric power may shut-off in the event of fire, such temperature map or "heat map" can give valuable information in at least X and Y direction on where the source of heat or smoke/fume most likely has occurred.

The remotely operated vehicles may be container handling vehicles comprising a lifting assembly for picking up storage containers from the storage columns to a position above the lowest level of the transport mechanism, and the lifting assembly may comprise a lifting frame connectable to a storage container, the lifting frame being configured to lift and lower the storage containers from a position in the storage column to a position above the rail system.

The automated storage and retrieval system may further comprise:
- a plurality of stacks of storage containers arranged in storage columns located beneath the rail system, and each storage column may be located vertically below a grid opening.

A majority, i.e. more than 50% of the remotely operated vehicles may comprise an interface connection of the fire detection devices. The interface may be a plug-in module facilitating connection of the plug-in module to the respective remotely operated vehicles. The interface connection may be connected to a fire detection device.

It is further described a method of creating information with regards to location of any heat- or fume emission on an automated storage and retrieval system, the automated storage and retrieval system comprising:
- a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;

wherein the method comprises:
- operating a plurality of remotely operated vehicles on the rail system, each of the remotely operated vehicles being provided with a fire detection device, wherein the fire detection devices are configured to transmit data from the fire detection device to a master control system;
- operating a master control system, which master control system keeps track of any remotely operated vehicles operating on the rail system and is configured to receive input from any of the fire detection devices;
- utilizing the master control system to process any input from the fire detection device from any of the fire detection devices and using the master control system to generate a heat map which provide information of location of a source of the heat- or fume emission and/or the current temperature/temperature profile of the heat- or fume emission.

It is further described a method of verifying a detected heat- or fume indication on an automated storage and retrieval system, the automated storage and retrieval system comprising:

a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; wherein the method comprises:

operating a plurality of remotely operated vehicles on the rail system, each of the remotely operated vehicles being provided with a fire detection device, wherein the fire detection devices are configured to transmit data from the fire detection device to a master control system;

operating a master control system, which master control system keeps track of any remotely operated vehicles operating on the rail system and is configured to receive data from the fire detection device from any of the fire detection devices; and in event of data from the fire detection device from a heat detection device on a first remotely operated vehicle indicating a detected heat- or fume emission, the method further comprises a step of:

allocating a second remotely operated vehicle with a fire detection device to move to a cell nearby the position of the remotely operated which has identified heat- or fume to verify heat- or fume emission.

In case the second remotely operated vehicle provides data from the fire detection device to the master control system indicating presence of heat- or fume emission, the method may further comprise the steps of:

allocating a third remotely operated vehicle with a fire detection device to move to a cell nearby the position of the first and second remotely operated vehicles; and utilizing the master control system to process the data from the fire detection devices from the first, second and third remotely operated vehicles, and the master control system may, based on the processing of the data from the fire detection devices, decide whether a reasonable prediction on location of source of the fume- or heat emission can be given.

If the master control system has decided that a reasonable prediction on location of source of the fume- or heat emission can be given, the method may comprise the step of:

utilizing the master control system to create a triangular arrangement enclosing the source of the fume, smoke or heat emission.

If the master control system has decided that a reasonable prediction on location of source of the fume- or heat emission cannot be given, the method may comprise the step of:

allocating a fourth remotely operated vehicle with a fire detection device to move to a cell nearby the position of the first, second and third remotely operated vehicles; and utilizing the master control system to process the data from the fire detection devices from the first, second, third and fourth remotely operated vehicles, and the master control system may, based on the processing of the data from the fire detection devices, decide whether a reasonable prediction on location of source of the fume- or heat emission can be given.

If the master control system has decided that a reasonable prediction on location of source of the fume- or heat emission can be given, the method may comprise the step of:

utilizing the master control system to create a four-cornered polygon enclosing the source of the fume, smoke or heat emission.

The fire detection devices may be fume or smoke detectors and the data from the fire detection devices may represent presence of fume or smoke.

The fire detection devices may be heat detectors and the data from the fire detection devices may represent presence of heat.

The fire detection devices may be a combination of fume or smoke detectors and heat detectors and the data from the fire detection devices may represent presence of fume or smoke or heat. In this latter aspect, increased probability of locating the actual source of the emission of fume, smoke or heat is provided, as the master control system may combine different kinds of data from the heat detection devices (e.g. fume, smoke and heat) to produce an even more reliable heat map or predicted location of the source.

The fire detection device may be smoke detectors of ionization (ionic) type or photoelectric (optic) type or a combination of ionization or photoelectric type. Furthermore, as indicated above, the fire detection devices may be combinations of multiple sensor types such as heat detection, optical smoke detection, carbon monoxide detection creating rapid acting and fail-proof multi-sensor smoke detectors to reduce false alarms whilst giving the earliest warning of fire. The fire detection devices may further or additionally comprise infra-red sensors, cameras, CO concentration meters, $CO_2$ concentration meters, temperature sensors, opacity meters etc.

Opacity meters detect and measure the amount of light blocked and is defined as the measure of the impenetrability of electromagnetic radiation through a sample. The opacity instruments are normally used to analyse air and smoke which media types can be described as "clean" or "dirty" dependent on their opacity. Opacity measurement largely depends on the concentration of particles within a sample. When electromagnetic radiation—in this case visible light or infrared radiation—is emitted toward a sample, suspended solids will scatter, reflect, and absorb the radiation, preventing it from passing through. Opacity sensors measure the quantity of transmitted light and convert it to a relevant value.

The method may further comprise, prior to the last step, a step of:

using a stationary fire detection device arranged in or at the automated storage and retrieval system. The stationary fire detection devices may arranged on or within the storage grid or delivery system, or adjacent the storage grid or delivery system.

The remotely operated vehicles are normally widely spread on the grid, thus if a least a majority of the remotely operated vehicles are provided with a fire detection device, there is a high possibility of early detection of heat- or fume emission. Therefore, it is not necessarily necessary that all of the remotely operated vehicles are provided with a fire detection device. Furthermore, as the master control system keeps track of the position of all of the remotely operated vehicles (i.e. both any container handling vehicles and delivery vehicles), if any heat- or smoke detection device senses smoke or heat, the master control system automatically knows the location of the remotely operated vehicle (and thus the location of the heat- or fume emissions).

An advantage of providing the remotely operated vehicles with heat- or smoke detection device(s) internally or externally of the remotely operated vehicle is earlier identification of potential heat- or fume emission compared to solutions with heat- or smoke detectors in the ceiling.

In an aspect, if the master control system receives data representing heat- or smoke information it may utilize the system's so-called XHandler ("exception-handler") program. The XHandler program autonomously handles specific error exceptions in an automatic storage and retrieval system without shutting down operations. For example, if a container handling vehicle loses its position, XHandler will block a safe area around the container handling vehicle and help determine the location by identifying the nearby bin pattern. If XHandler can't determine this, another container handling vehicle will make a unique bin pattern (depth of several bins). If it can't, another container handling vehicle will make a unique bin pattern by removing a few bins.

In the present case, if the master control system receives data representing heat- or smoke or fume information, it may employ the XHandler program to instruct other container handling vehicles or delivery vehicles to the location where heat or smoke has been detected in order to confirm whether there is actually a heat- or fume emission which needs to be taken care of or if there is a false alarm.

False alarms may occur in many different events, such as due to short sparks or ignition resulting from friction between the wheels of the remotely operated vehicle and the tracks, internal heating inside a remotely operated vehicle due to overload, motor failure, lifting device motor failure etc. in the remotely operated vehicle.

The heat- or smoke detection devices may at least transmit data from the fire detection device indicating a heat- or fume emission to a master control system.

The fire detection devices may comprise combined transmitters and receivers, such that they are able to transmit and receive data from the fire detection device to the master control system. The transmitters and receivers of the fire detection devices can be connected to a controller, which controller may be similar to the ones which are used for general communication between the master control system and the remotely operated vehicles. Alternatively, the controllers for the transmitters and receivers may be different from the ones which are used for the general communication. The skilled person will know how to program such controllers to communicate with the master control system, thus this will not be further elaborated on herein. In addition, it may also be possible that the fire detection devices are able to transmit data from the fire detection device to other fire detection device(s) and receive data from the fire detection device from other fire detection device(s).

The main grid may be a storage grid and the plurality of remotely operated vehicles may be container handling vehicles operating on the storage grid, which container handling vehicles comprise a lifting device for lifting and lowering storage containers from below to a position above the uppermost point of the rail system of the storage grid.

Alternatively, the main grid may be a delivery grid and the plurality of remotely operated vehicles may be delivery vehicles. The remotely operated vehicles may be delivery vehicles comprising a closed bottom portion and may be configured to receive storage containers from above. In contrast to the container handling vehicles operating on the storage grid, which container handling vehicles comprise lifting device for lifting and lowering storage containers from below, the delivery vehicles comprises a closed bottom portion and are configured to receive storage containers from above (for example from container handling vehicles operating on storage grid at a level above the delivery system where the delivery vehicles operate).

If a plurality of the remotely operated vehicles are provided with a fire detection device, input in the form of data from the fire detection device from two or more fire detection devices on at least two remotely operated vehicles, can be processed in order to generate a "heat map" which can provide the firefighting crew with valuable information in terms of location of the fire or smoke and/or the current temperature/temperature profile of the heat- or fume emission. In order to obtain a more reliable heat map than heat maps based on fire detection devices providing only "yes/no" input with regards to presence of heat- or fume, it may be advantageous to utilize three or more fire detection devices which can provide additional input to the master control system with regards to concentration of fume or smoke, or in case of heat detection, additional input from e.g. an infra-red camera or temperature sensor on the remotely operated vehicle.

Some or all of the remotely operated vehicles may comprise an interface connection of the fire detection devices. The interface may be a plug-in module facilitating connection of the plug-in module to the respective remotely operated vehicles.

The remotely operated vehicles may be equipped with light in order to assist the firefighting crew, and in particular in case of loss of power supply shutting down normal light sources.

BRIEF DESCRIPTION OF THE DRAWINGS

The following drawings depict exemplary embodiments of the present invention and are appended to facilitate the understanding of the invention. However, the features disclosed in the drawings are for illustrative purposes only and shall not be interpreted in a limiting sense.

FIG. 1 A-D are perspective views of a prior art automated storage and retrieval system, where

FIG. 2A shows a single rail system, FIG. 2B shows a double rail system and FIG. 2C shows a double rail system with the width and length of a container handling vehicle grid cell indicated;

DETAILED DESCRIPTION OF THE INVENTION

Figure 1A:
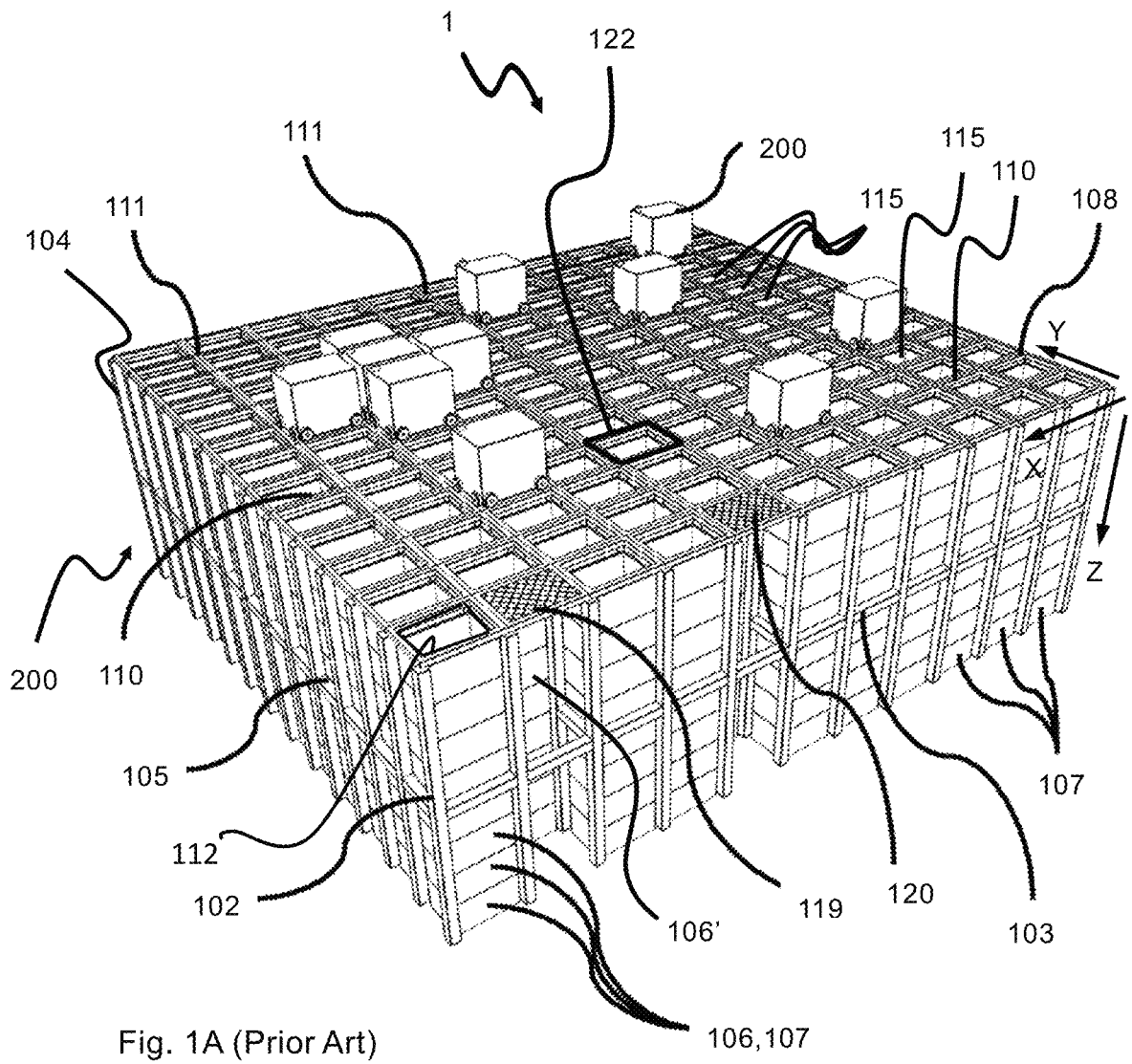
FIG. 1A and FIG. 1C show the complete system and FIG. 1B and FIG. 1D show examples of a system operable with prior art container handling vehicles.
Figure 1B:
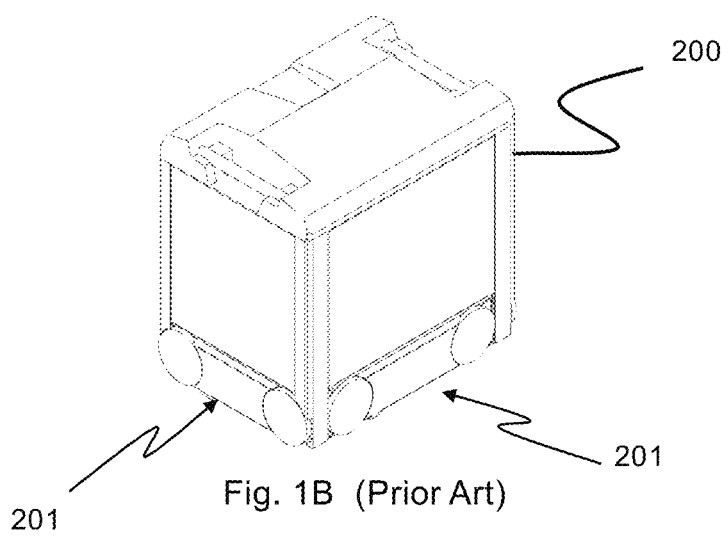

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the related methods as well, and vice versa.

With reference to FIGS. 1A-D the storage grid 104 of each storage structure 1 constitutes a framework 100 of in total 143 grid columns 112 (see grid column 112 in top front corner, i.e. grid location or cell X=11, Y=1, Z=0), where the width and length of the framework corresponds to the width and length of 13 and 11 grid columns 112, respectively. The top layer of the framework 100 is a container handling vehicle rail system/rail system 108 on which a plurality of container handling vehicles 200, 300 are operated.

Figure 1C:
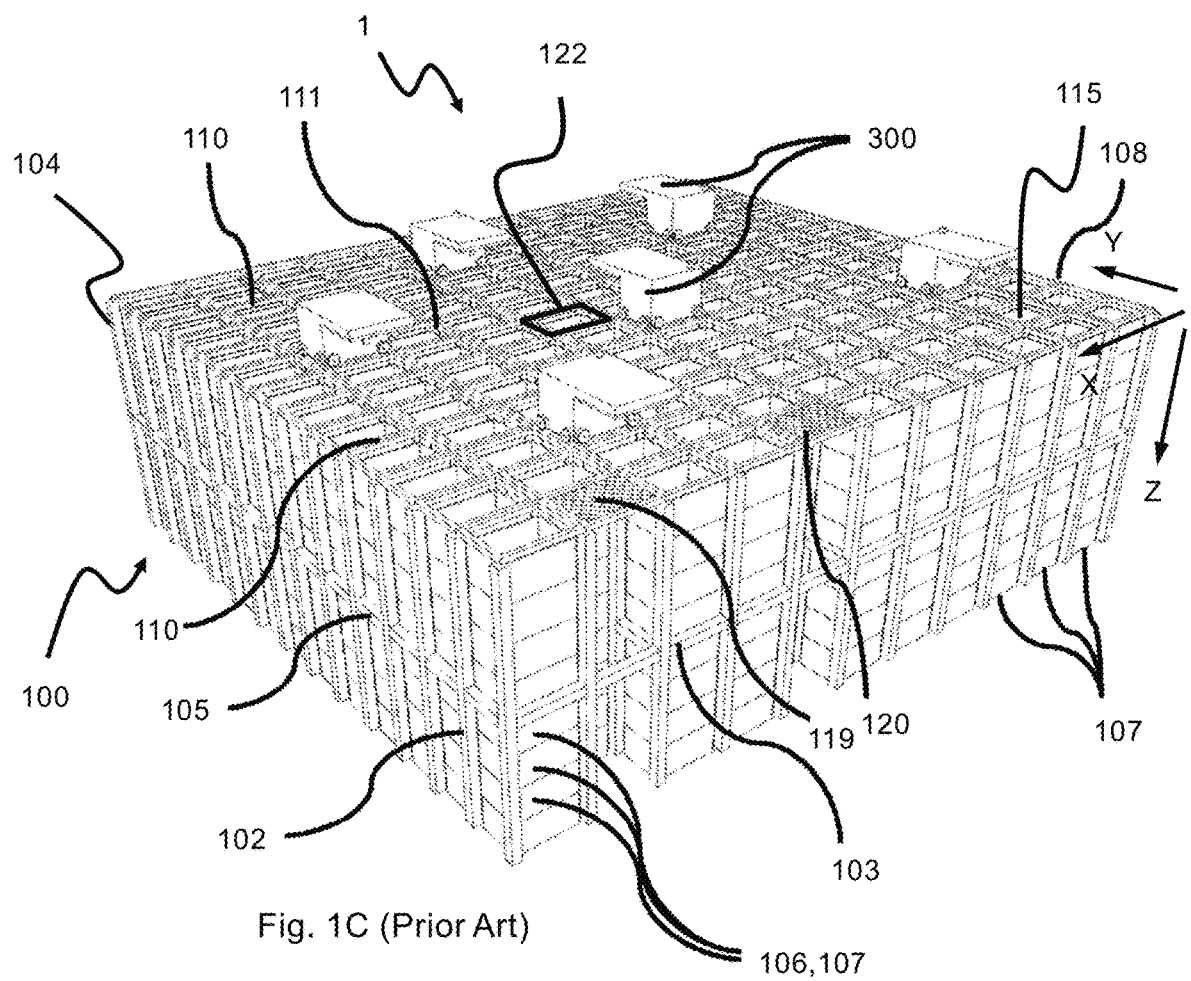
Figure 1D:
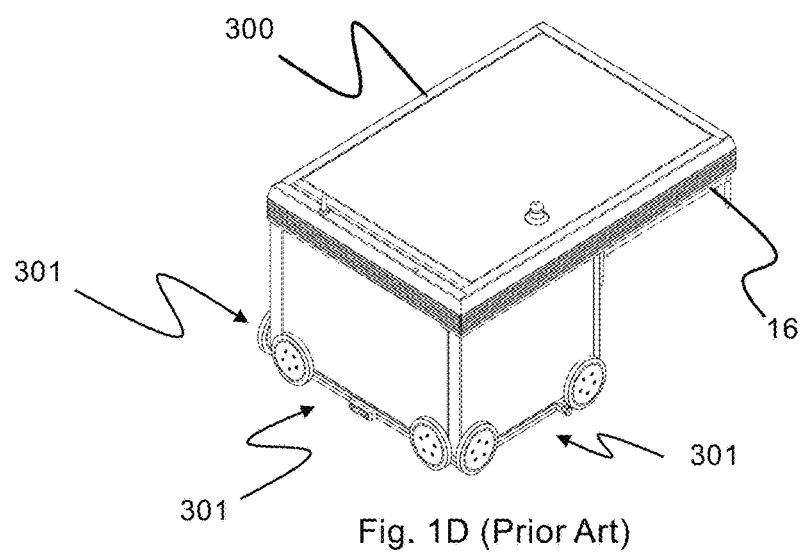

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110, 111 in the X direction and the Y direction, respectively, arranged across the top of storage columns 105. The horizontal area of a single grid opening 115, i.e. along the X and Y directions, may be defined by the distance between adjacent rails 110 and 111, respectively (see also FIGS. 2A-2C). In FIGS. 1A and 1C, a grid cell 122 is marked on the rail system 108 by thick lines. The area between adjacent rails is the grid opening 115—the grid cell 122 is the area to the outer side edges of the opposing rails running along the opposite sides of the grid opening. Alternatively, if these are defined in terms of double-tracked rails, then the area is to the midpoint or centre of each adjacent rail.

The container handling vehicle rail system 108 allows the container handling vehicles 200, 300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the storage grid 104 may have a horizontal extent of more than 700×700 grid cells 122, or any size in between these examples, e.g. 100×100 grid cells, 200×200 grid cells, 500×500 grid cells etc. Also, the grid 104 can be considerably deeper than disclosed in FIGS. 1A and 1C. For example, the storage grid 104 may be more than twelve grid cells deep.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119, 120 configured to receive a storage container 106 from a container handling vehicle 200, 300.

The rail system 108 comprises a first set of parallel trails 110 arranged in a horizontal plane (P) and extending in a first direction (X) and a second set of parallel rails 111 arranged in the horizontal plane (P) and extending in a second direction (Y) which is orthogonal to the first direction (X). The first and second sets of rails 110, 111 form a grid pattern in the horizontal plane (P) comprising a plurality of adjacent grid cells 122.

Each grid cell 122 displays a grid opening defined by a pair of neighbouring rails of the first set of rails 110 and a pair of neighbouring rails of the second set of rails 111.

The plurality of stacks 107 are arranged in storage columns 105 located beneath the rail system 108, wherein each storage column 105 is located vertically below a grid cell 122.

Each container handling vehicle 200, 300 is configured to move on the rail system 108 above the storage columns 105.

The storage container vehicles 200, 300 may be of any type known in the art, e.g. any one of the automated container handling vehicles disclosed in WO2014/090684 A1, in NO317366 or in WO2015/193278A1.

Figure 2A:
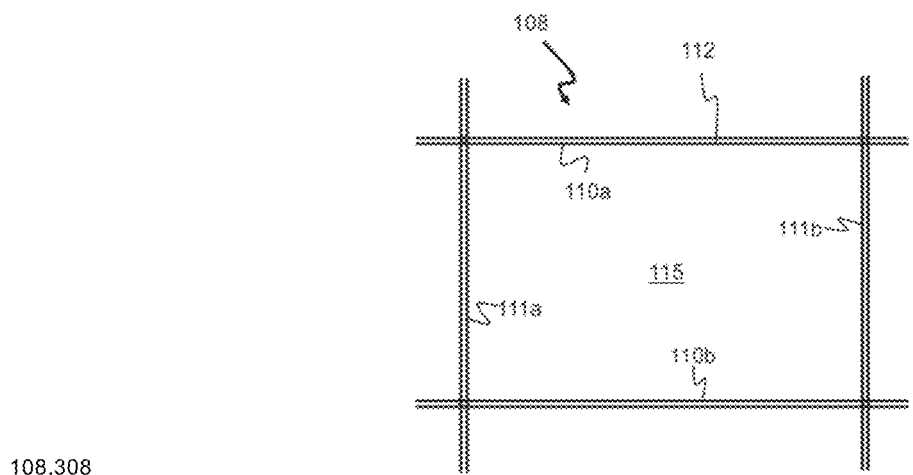
FIG. 2A-C is a top view of a container handling vehicle rail system, where
Figure 2B:
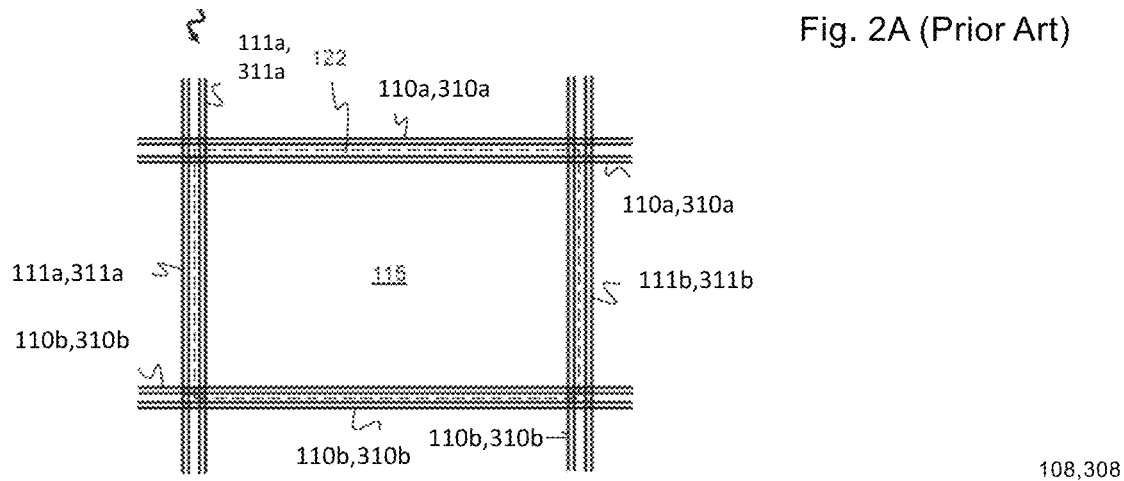
Figure 2C:
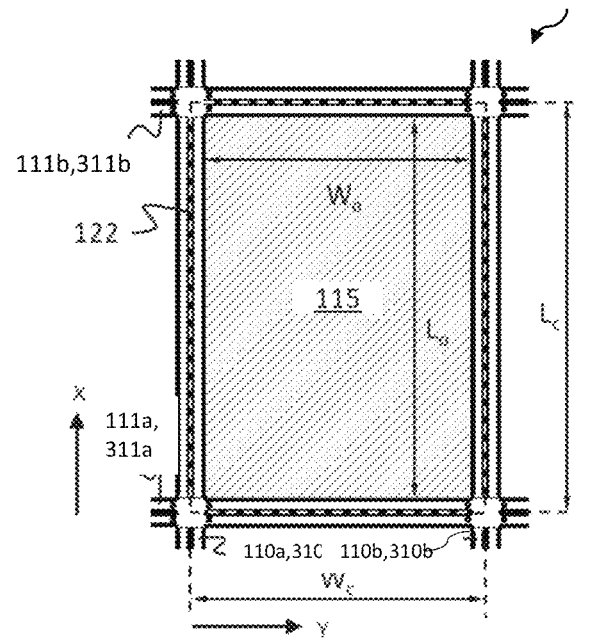

The rail system 108 may be a single rail system, as is shown in FIG. 2A. Alternatively, the rail system 108 may be a double rail system, as is shown in FIG. 2B. In a further alternative, the rail system 108 may be a combination of single and double rail system. Details of the single and double rail systems are disclosed in this specification under the section of background and prior art.

Figure 3A:
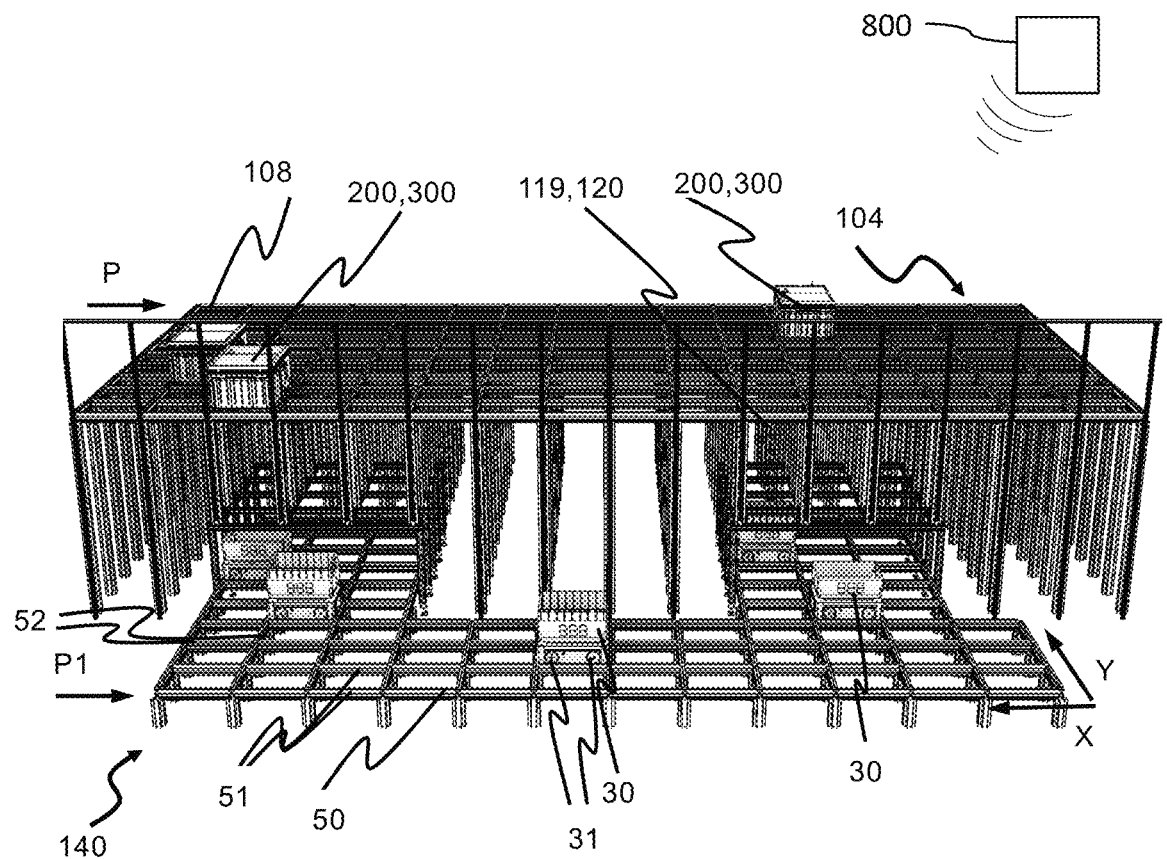
FIG. 3A is a perspective view of an exemplary embodiment of a storage grid and a delivery system comprising delivery rail system and delivery vehicles.

Perspective views of an automated storage and retrieval system are shown in FIG. 3A. The automated storage and retrieval system comprises a storage grid 104, onto which a plurality of container handling vehicles 200, 300 operates, and a delivery system 140 comprising a delivery rail system 50 onto which a plurality of delivery vehicles 30 operates. The delivery vehicles 30 are provided with wheel arrangement 31 comprising first and second sets of wheels for driving the delivery vehicles in the first direction (X) and the second direction (Y). A master control system 800 keeps track of the container handling vehicles 200, 300 operating on the storage grid 104 and the delivery vehicles 30 operating on the delivery rail system 30.

Further, the delivery system 140 comprises one or more of the delivery vehicles 30 as described above, i.e. delivery vehicles 30 configured to receive and support one or more storage containers 106 for transport between one or more delivery columns 119, 120 of the storage grid 104 and one or more predetermined positions outside the storage grid 104. The predetermined positions may for example be a second location, a container accessing station, a conveyor line, another storage container, or a transport vehicle such as a truck.

The delivery system 140 may further comprise a delivery rail system 50 situated below a delivery port of the one or more delivery columns 119, 120.

As shown in FIG. 3, the delivery rail system 50 may be constructed in the same way or a similar way as the rail system 108 for the container handling vehicles 200, 300.

Hence, the delivery rail system 50 may comprise a first set of parallel rails 51 arranged in a horizontal plane (P1) and extending in a first direction (X), and a second set of parallel rails 52 arranged in the horizontal plane (P1) and extending in a second direction (Y) which is orthogonal to the first direction (X).

The delivery rail system 50 may also be a double rail system, as is shown in FIG. 2B, thus allowing a delivery vehicle 30 having a footprint generally corresponding to the lateral area defined by a delivery grid column to travel along a row of grid columns even if another delivery vehicle 30 is positioned above a grid column neighbouring that row.

Both the single and double rail system, or a combination comprising a single and double rail arrangement in a single rail system, forms a grid pattern in the horizontal plane P1 comprising a plurality of rectangular and uniform grid locations or grid cells, where each grid cell comprises a grid opening being delimited by a pair of rails of the first rails and a pair of rails of the second set of rails.

In contrast to the container handling vehicles 200, 300 operating on the storage grid 104, which container handling vehicles 200, 300 comprise a lifting device 16 for lifting and lowering storage containers 106 from below, the delivery vehicles 30 comprises a closed bottom portion and are configured to receive storage containers 106 from above (for example from container handling vehicles 200, 300 operating on storage grid 104 at a level above the delivery system 140 where the delivery vehicles 30 operate).

Figure 3B:
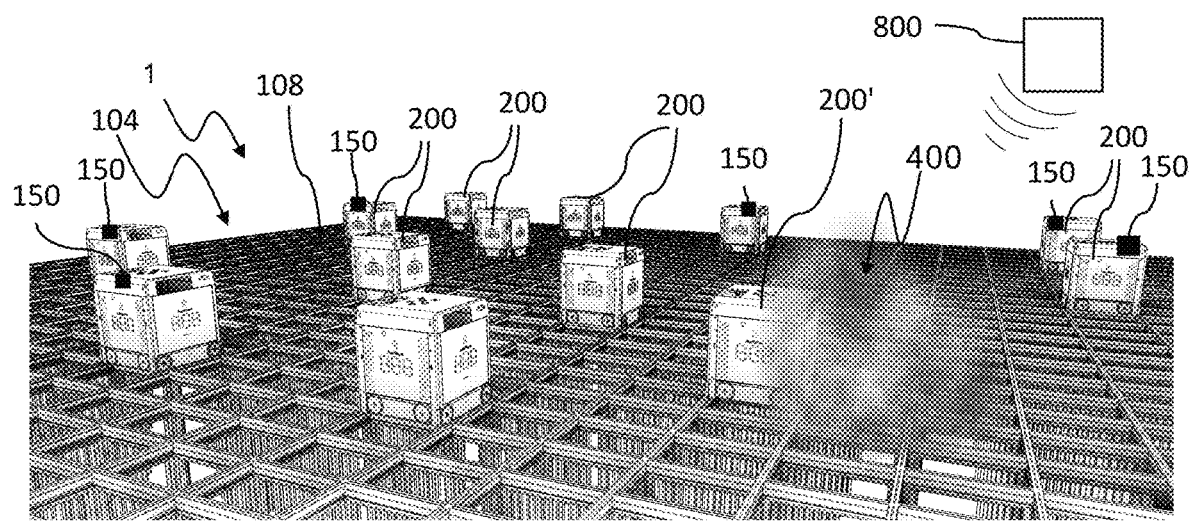
FIGS. 3B and 3C show two examples where fume, smoke or heat emission has occurred in an automated storage and retrieval system.
Figure 3C:
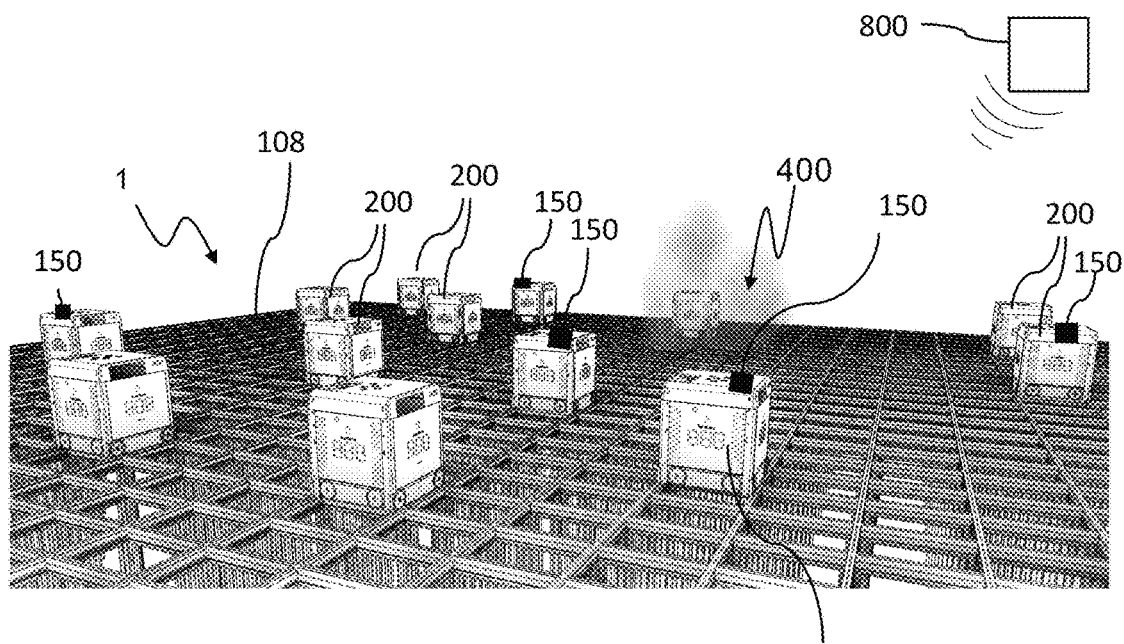

FIGS. 3B and 3C show two examples where fume, smoke or heat emission 400 has occurred on a storage grid 104 in an automated storage and retrieval system 1. A plurality of container handling vehicles 200, 200' operates on a rail system 108 of a storage grid 104 in an automated storage and retrieval system 1 and communicates with a master control system 800. Some of the container handling vehicles 200, 200' have been equipped with fire detection device 150. However, preferably a majority, preferably above 50%, of the container handling vehicles 200, 200' comprises a fire detection device 150, possibly together with stationary fire detection devices 150 arranged on the storage grid 104.

It is clear that, although not disclosed, that the delivery vehicles 30 operating on a delivery rail system 50 of a delivery system 140 like the one in FIG. 3A, may also be equipped with, or comprise, fire detection device(s) 150 in order to detect any fume, smoke or heat emission 400 within the delivery system 140, possibly together with stationary fire detection devices 150 arranged on the delivery system 140.

Figure 4:
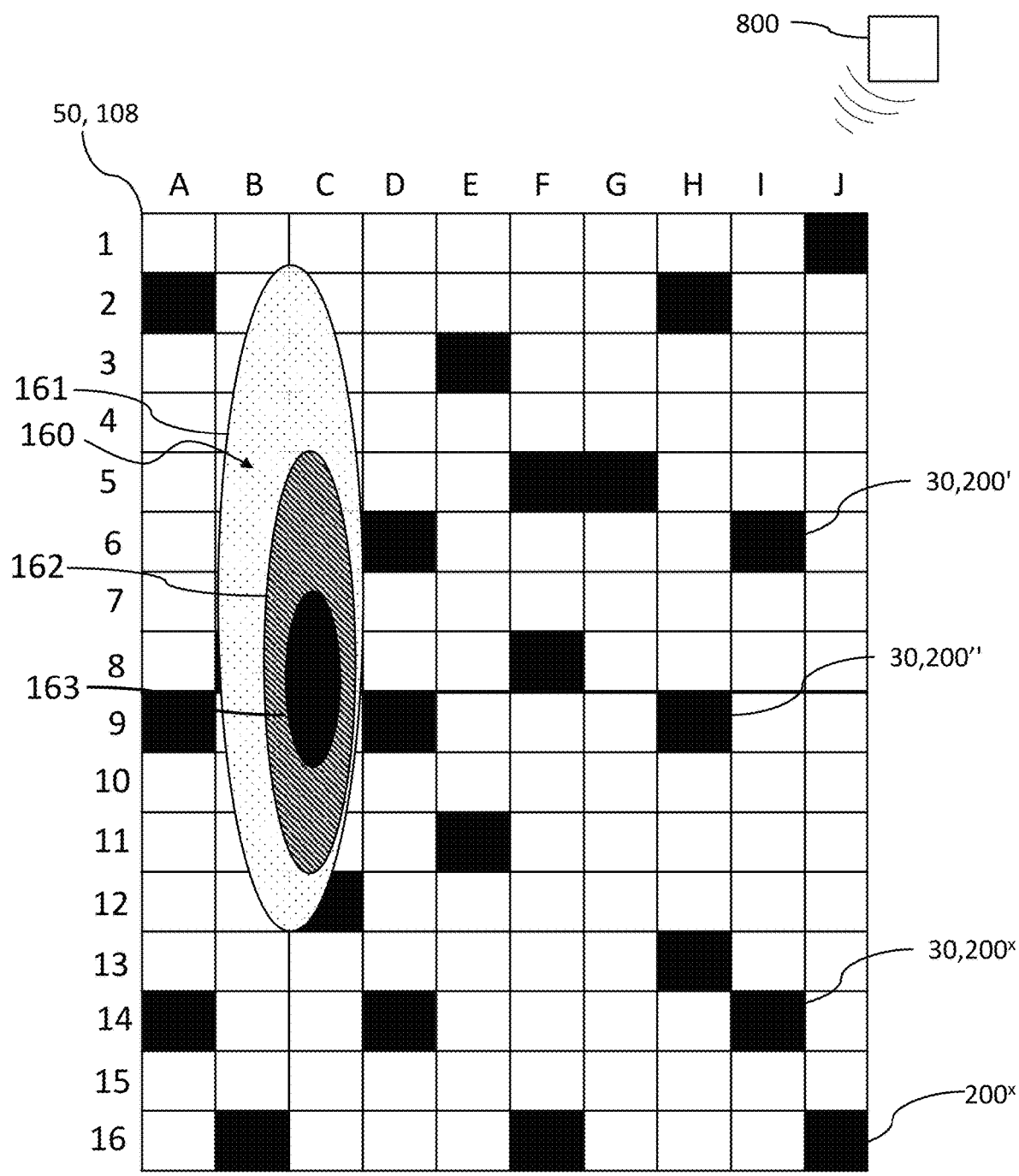
FIG. 4 shows an example of a heat map created by the master control system based on input from a plurality of fire detection devices arranged on container handling vehicles.

FIG. 4 shows an example of a heat map created by the master control system based on input from a plurality of fire detection devices 150 arranged on container handling vehicles 200, 300.

In the following, an example of utilizing fire detection devices 150 on container handling vehicles 200', 200$^x$ such as to create a heat map 160 will be described in greater detail. However, it is apparent, as is also shown in FIG. 4, fire detection devices 150 may also be arranged on delivery vehicles 30 such that a similar heat map ay be created based on data from the fire detection device from fire detection devices 150 on delivery vehicles 30. Order for the master control system 800 to provide the heat map 160, preferably three or more fire detection devices 150 which can provide additional input to the master control system 800 with regards to concentration of fume or smoke, or in case of heat detection, additional input from e.g. an infra-red camera or temperature sensor on the container handling vehicle 200', 200$^x$, are utilized. Then, based on the location of the container handling vehicle 200', 200$^x$ on the rail system 108 and the concentration of fume or smoke measured by the heat detection device 150, the master control system 800 can create a heat map 160 which indicates the probable location of the source of the fume, smoke or heat emission (see FIGS. 3B and 3C). The disclosed heat map 160 comprises an outer portion 161 indicated by coarse-grains, an intermediate portion 161 indicated by stripes and an inner portion 162 indicated by solid black. The heat map 160 may indicated that it is certain that the source of the fume, smoke or heat emission 400 is within the outer portion 161, and almost certain that the source of the fume, smoke or heat emission 400 is within the striped portion 161, and very likely that the source of the fume, smoke or heat emission 400 is within the inner portion 162. If the master control system 800 has drawn up such a heat map 160, it is most promising for any fire-fighting crew to focus their initial fire-fighting in the inner portion 162 (i.e. within cell locations B7-B10 and C7-C10) on FIG. 4. Although the figure is shown in relation to container handling vehicles on a storage grid, a similar figure may be made based on input from fire detection devices arranged on delivery vehicles operating on a delivery rail.

Figure 5:
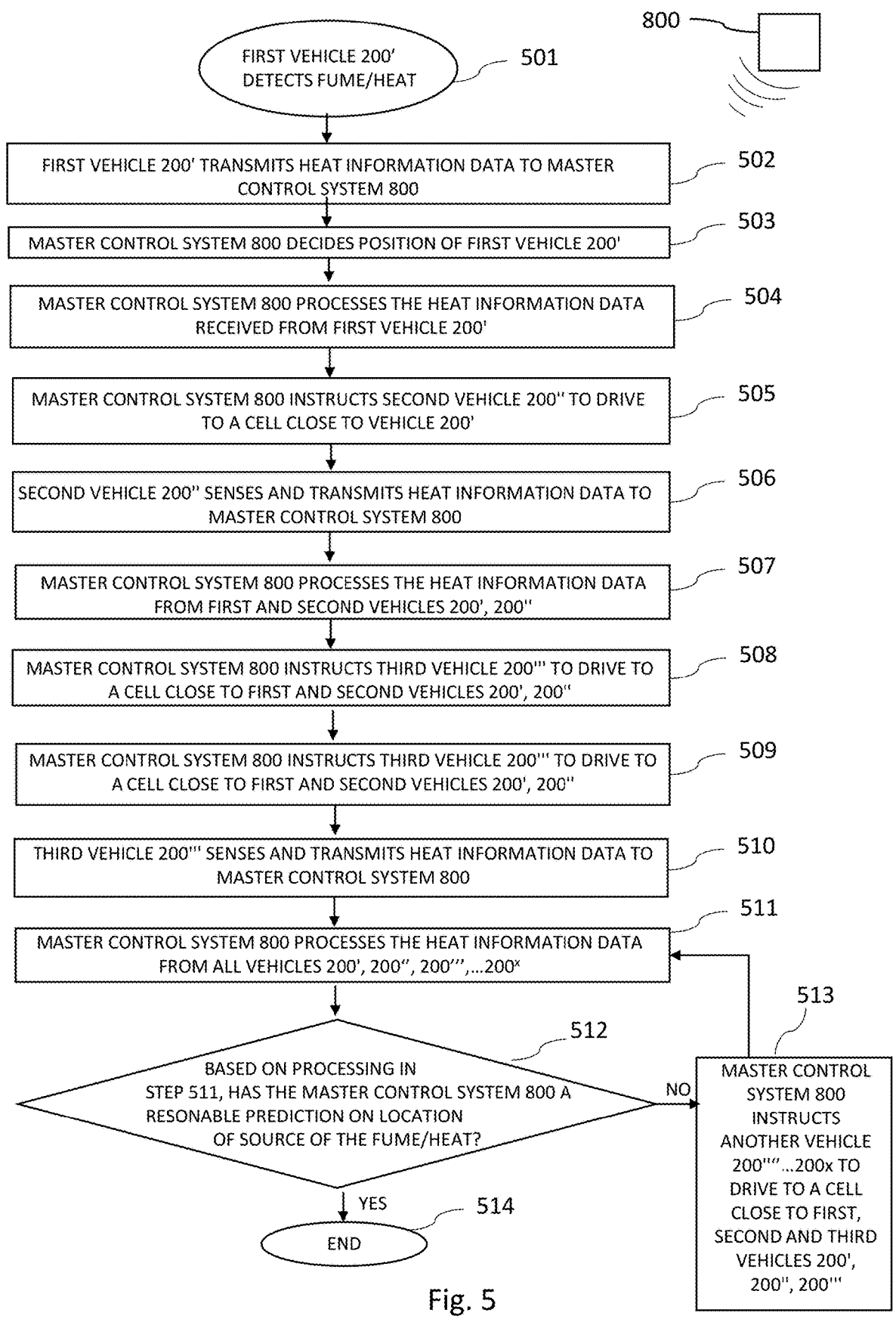
FIG. 5 is a flow-chart of an example of steps to be taken in the event a container handling vehicle detects fume, smoke or heat.

FIG. 5 is a flow-chart of an example of steps to be taken in the event a container handling vehicle or delivery vehicle detects fume, smoke or heat. Such a process may include the following steps:

Step 501: VEHICLE DETECTS FUME/HEAT

Step 502: FIRST VEHICLE 200' TRANSMITS DATA FROM THE FIRE DETECTION DEVICE TO MASTER CONTROL SYSTEM 800

Step 503: MASTER CONTROL SYSTEM 800 DECIDES POSITION OF FIRST VEHICLE 200'

Step 504: MASTER CONTROL SYSTEM 800 PROCESSES THE DATA FROM THE FIRE DETECTION DEVICE RECEIVED FROM FIRST VEHICLE 200'

Step 505: MASTER CONTROL SYSTEM 800 INSTRUCTS SECOND VEHICLE Step 200" TO DRIVE TO A CELL CLOSE TO VEHICLE 200'

Step 506: SECOND VEHICLE 200" SENSES AND TRANSMITS DATA FROM THE FIRE DETECTION DEVICE TO MASTER CONTROL SYSTEM 800

Step 507: MASTER CONTROL SYSTEM 800 PROCESSES THE DATA FROM THE FIRE DETECTION DEVICE FROM FIRST AND SECOND VEHICLES 200', 200"

Step 508: MASTER CONTROL SYSTEM 800 INSTRUCTS THIRD VEHICLE 200'" TO DRIVE TO A CELL CLOSE TO FIRST AND SECOND VEHICLES 200', 200"

Step 509: MASTER CONTROL SYSTEM 800 INSTRUCTS THIRD VEHICLE 200'" TO DRIVE TO A CELL CLOSE TO FIRST AND SECOND VEHICLES 200', 200"

Step 510: THIRD VEHICLE 200'" SENSES AND TRANSMITS DATA FROM THE FIRE DETECTION DEVICE TO MASTER CONTROL SYSTEM 800

Step 511: MASTER CONTROL SYSTEM 800 PROCESSES THE DATA FROM THE FIRE DETECTION DEVICE FROM ALL VEHICLES 200', 200", 200'", . . . 200$^x$ Step 512: BASED ON PROCESSING IN STEP 511, HAS THE MASTER CONTROL SYSTEM 800 A REASONABLE PREDICTION ON LOCATION OF SOURCE OF THE FUME/HEAT?

IF "YES" IN STEP 512 proceed to step 514: END

IF "NO" IN STEP 512: proceed to step 513: MASTER CONTROL SYSTEM 800 INSTRUCTS ANOTHER VEHICLE 200"" . . . 200$x$ TO DRIVE TO A CELL CLOSE TO FIRST, SECOND AND THIRD VEHICLES 200', 200", 200'"

FIGS. 6A-6D are sequential step-by-step illustrations of the flow-chart of FIG. 5, where one and one container handling vehicle 200$^{' \cdots x}$ with a fire detection device is instructed to drive to grid cells close to a container handling vehicle 200' that has detected fume, smoke or heat 400 in order for the master control system 800 to process data from the fire detection device received from the container handling vehicles 200$^{' \cdots x}$ to predict location of the source of the fume, smoke or heat 400.

Figure 6A:
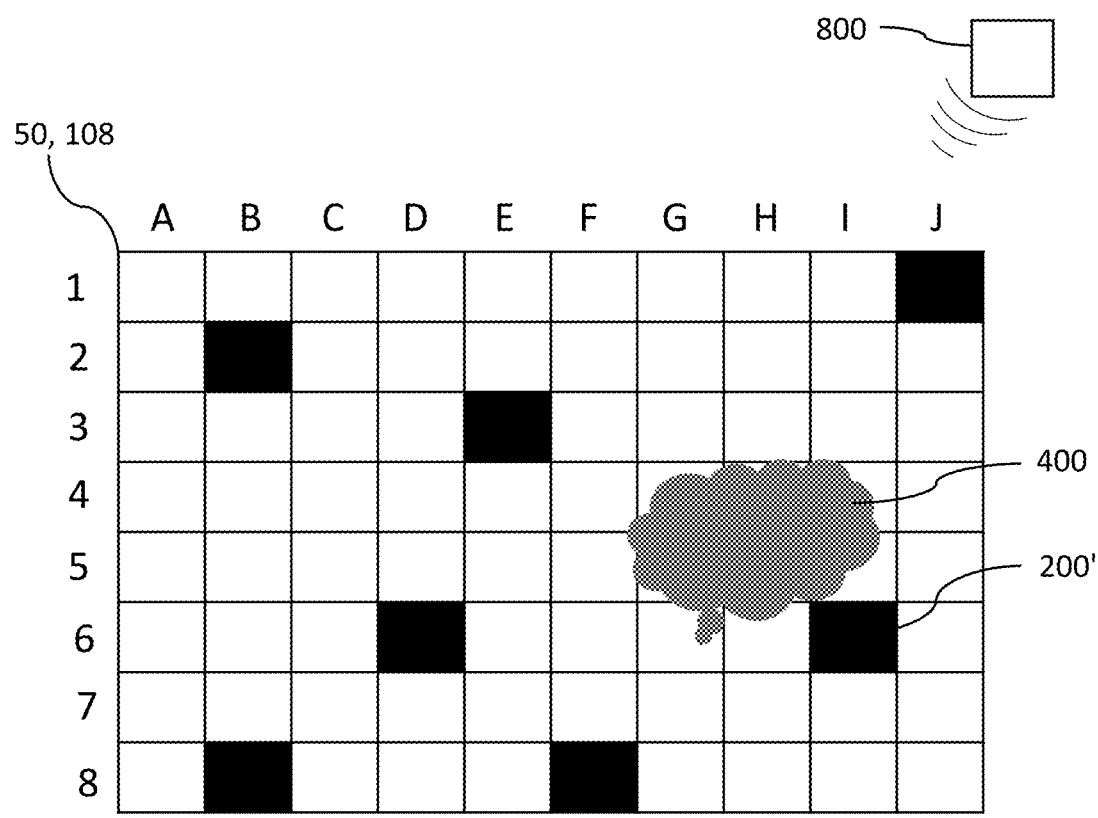
FIGS. 6A-6D are sequential step-by-step illustrations of the flow-chart of FIG. 5, where one and one container handling vehicle with a fire detection device is instructed to drive to grid cells close to a detected fume, smoke or heat in order for the master control system to process data from the fire detection device received from the container handing vehicles to predict a location of the source of the fume, smoke or heat.

In FIG. 6a a first container handling vehicle 200' in cell H5, which first container handling vehicle 200' is provided with a fire detection device (not shown in FIG. 6A), detects fume, smoke or heat 400. The first container handling vehicle 200' transmits data from the fire detection device to master control system 800. The master control system 800 keeps continuous track of all of the container handling vehicles 200', and thus know the position of the first container handling vehicle 200' which has detected fume, smoke or heat 400. The master control system 800 processes the data from the fire detection device received data from the fire detection device received from the first container handling vehicle 200'.

Figure 6B:
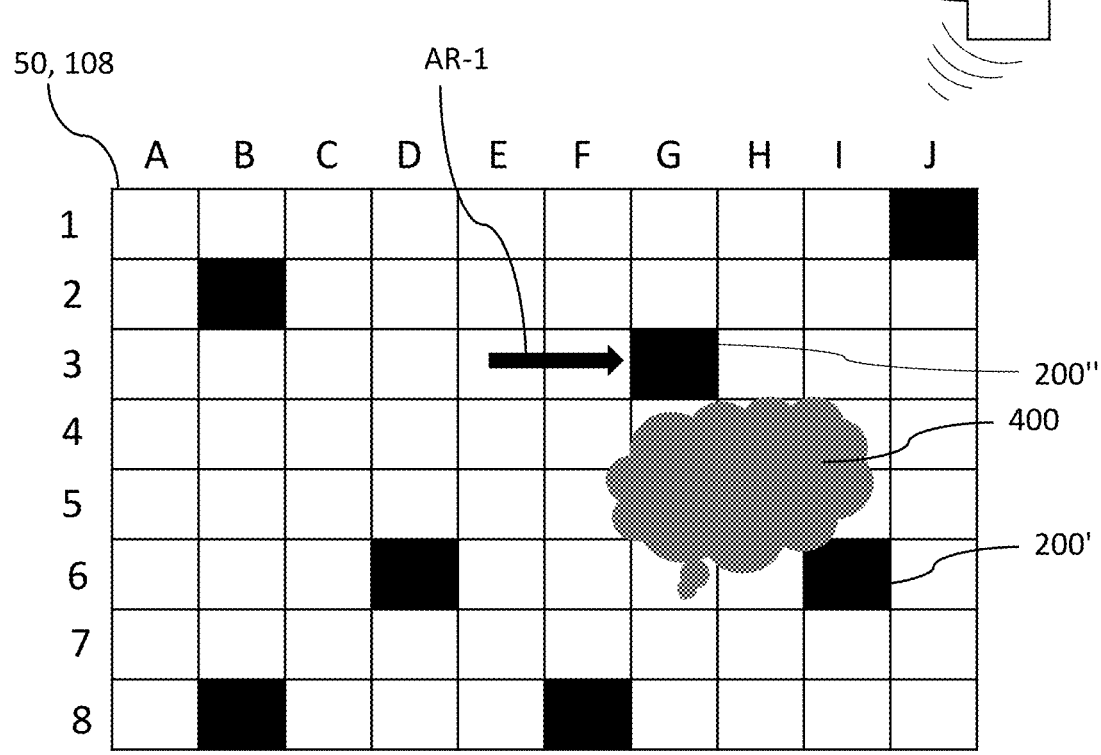

In FIG. 6B the master control system 800, based on the input from the first container handling vehicle 200', has instructed a second container handling vehicle 200" initially positioned in cell E3, to move to cell G3 (as illustrated by arrow AR-1) which is closer to the first container handling vehicle 200' (and expected to be closer to the source of the fume, smoke or heat emission 400). When the second container handling vehicle 200" enters or has entered cell G3, the fire detection device of the second container handling vehicle 200" transmits data from the fire detection device to the master control system 800. The master control system 800 processes data from the fire detection device from the first and second container handling vehicles 200', 200".

Figure 6C:
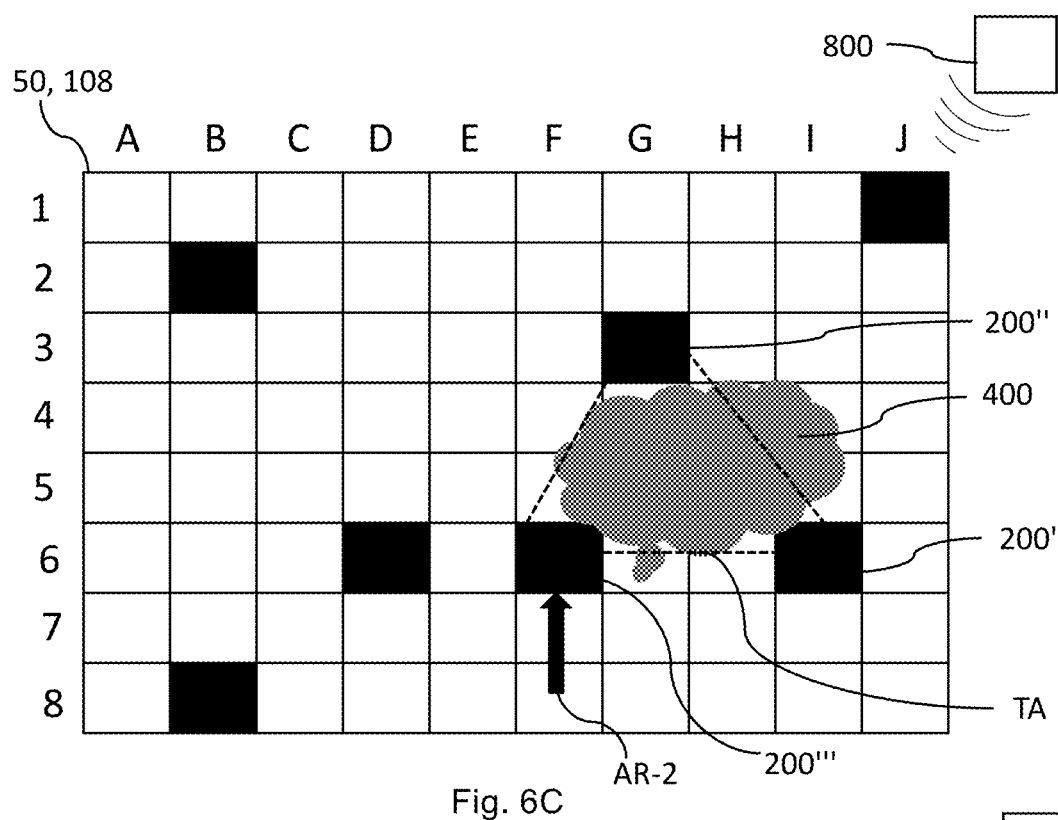

In FIG. 6C the master control system 800, based on the input from the first and second container handling vehicles 200', 200", has instructed a third container handling vehicle 200''' initially positioned in cell F8, to move to cell F6 (as illustrated by arrow AR-2) which is closer to the first and second container handling vehicles 200', 200" (and expected to be closer to the source of the fume, smoke or heat emission 400). When the third container handling vehicle 200''' enters or has entered cell F6, the fire detection device of the third container handling vehicle 200''' transmits data from the fire detection device to the master control system 800. The master control system 800 processes data from the fire detection device from the first, second and third container handling vehicles 200', 200", 200'''. If the master control system 800, based on the processing has a reasonable prediction on the location of the source of the fume, smoke or heat 400, no further container handling vehicles $200^x$ are instructed to move closer to the expected source of the fume, smoke or heat emission 400. Normally, arranging three container handling vehicles 200', 200", 200''' in a triangular arrangement TA enclosing the source of the fume, smoke or heat emission 400, will be sufficient in order to establish a reasonable prediction on location of the source for the fume, smoke or heat emission 400 is. However, if a reasonable prediction on the location of the source of the fume, smoke or heat 400 cannot be established, yet another container handling vehicle $200^x$ is instructed to move to a cell closer to the expected source of the fume, smoke or heat emission 400, which situation is indicated in FIG. 6D.

Figure 6D:
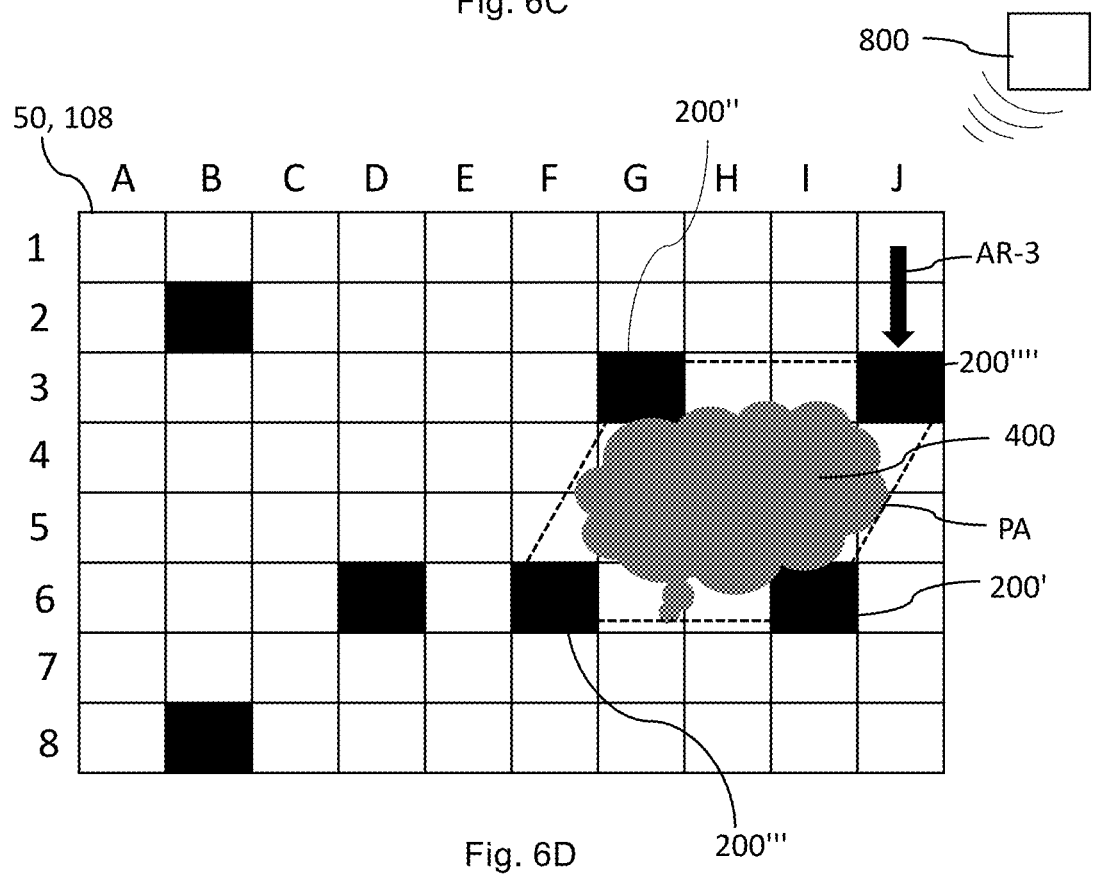

In FIG. 6D the master control system 800, based on the input from the first, second and third container handling vehicles 200', 200", 200''', has instructed a fourth container handling vehicle 200'''' initially positioned in cell J1, to move to cell J3 (as illustrated by arrow AR-3) which is closer to the first, second and or third container handling vehicles 200', 200", 200''' (and expected to be closer to the source of the fume, smoke or heat emission 400). When the fourth container handling vehicle 200'''' enters or has entered cell J3, the fire detection device of the fourth container handling vehicle 200'''' transmits data from the fire detection device to the master control system 800. The master control system 800 processes data from the fire detection devices from the first, second, third container handling vehicles 200', 200", 200''', 200''''. A total of four container handling vehicles 200', 200", 200''', 200'''' are arranged as a four-cornered polygon PA enclosing the source of the fume, smoke or heat emission 400. This setup is almost certainly enough to establish a reasonable location for the source of the fume, smoke or heat emission 400. However, in the unlikely event that four container handling vehicles 200', 200", 200''', 200'''' are not sufficient, the master control system 800 may instruct further container handling vehicles $200^x$ with fire detection device to move closer to the expected location of the source of the fume, smoke or heat emission 400.

In the preceding description, various aspects of an automated storage and retrieval system, vehicle and methods according to the invention have been described with reference to the illustrative embodiment. For example, in most of the figures, container handling vehicles operating on a rail system of a storage grid have been disclosed, but it is obvious that the same system and setup applies to delivery vehicles operating on a delivery rail in a delivery rail system. Thus, the description is not intended to be construed in a limiting sense. Various modifications and variations of the illustrative embodiments, as well as other embodiments of the system, which are apparent to persons skilled in the art, are deemed to lie within the scope of the present invention as defined by the following claims.

LIST OF REFERENCES

1 Automated storage and retrieval system
30 Delivery vehicle, remotely operated vehicle
31 Wheel arrangement delivery vehicle
50 Delivery rail system
51 First set of parallel rails, delivery rail system
51a, 51b Pair of rails of the first rails in delivery rail system
52 Second set of parallel rails, delivery rail system
52a, 52b Pair of rails of the second set of rails in delivery rail system
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction X
110a, 110b Pair of rails of the first rails
111 Second set of parallel rails in second direction Y
111a, 111b Pair of rails of the second set of rails
112 Grid column
115 Grid opening
119 Delivery column
120 Delivery column
122 Grid cell
140 Delivery system
150 Fire detection device
160 Heat map
161 Outer portion, course-grain
162 Intermediate portion, striped black
163 Inner portion, solid black
200, 300 Container handling vehicle, remotely operated vehicle
200', 200", . . . , $200^x$ First, second, . . . , x vehicle, remotely operated vehicle
201 Wheel arrangement
301 Wheel arrangement 800 Master control system
X First direction
Y Second direction
P Horizontal plane of rail system
P1 Horizontal plane of delivery rail system
$W_c$ Width of grid cell
$L_c$ Length of grid cell
$W_o$ Width of grid opening
$L_o$ Length of grid opening

The invention claimed is:

1. An automated storage and retrieval system comprising:
a master control system configured to keep track of a plurality of remotely operated vehicles operating on the automated storage and retrieval system, each of the plurality of remotely operated vehicles comprising a fire detection device configured to transmit data from the fire detection device to the master control system, wherein
the master control system comprises a processing device for processing the data from two or more of the fire detection devices, the processing of the data creating a heat map of the automated storage and retrieval system providing information in terms of a location of a fire or smoke or a current temperature or temperature profile of heat or fume emission,
wherein the master control system is configured, based on data from a first fire detection device of a first remotely operated vehicle at a first position indicating a detected heat or fume emission, to allocate a second remotely operated vehicle with a second fire detection device to move to a second position nearby the first position of the first remotely operated vehicle indicating the detected heat or fume emission to verify the detected heat or fume emission, and
wherein the master control system is configured, based on the second remotely operated vehicle providing data from the second fire detection device to the master control system indicating a presence of heat or fume emission, to:
allocate a third remotely operated vehicle with a third fire detection device to move to a third position nearby the first position of the first remotely operated vehicle and the second position of the second remotely operated vehicle;
process the data from the first fire detection device and the second fire detection device and data from the third fire detection device, and based on the processing, determine whether a reasonable prediction of a location of a source of the heat or fume emission can be given; and
generate the heat map providing information in terms of a location of a fire or smoke or a current temperature or temperature profile of the heat or fume emission.

2. The automated storage and retrieval system according to claim 1, wherein the remotely operated vehicles are container handling vehicles each comprising a lifting assembly for picking up a storage container from a storage column to a position above a lowest level of a first set and a second set of wheels, wherein the lifting assembly comprises a lifting frame connectable to a storage container, and the lifting frame is configured to lift and lower the storage container from a position in the storage column to a position above a rail system of the automated storage and retrieval system.

3. The automated storage and retrieval system according to claim 1, further comprising:
a plurality of stacks of storage containers arranged in storage columns located beneath a rail system of the automated storage and retrieval system, wherein each storage column is located vertically below a grid opening.

4. The automated storage and retrieval system according to claim 1, wherein the remotely operated vehicles are delivery vehicles comprising a closed bottom portion and are configured to receive storage containers from an above position.

5. The automated storage and retrieval system according to claim 1, wherein a majority of the remotely operated vehicles comprises an interface connection of the fire detection devices.

6. The automated storage and retrieval system according to claim 1, further comprising a rail system comprising a first set of parallel tracks arranged in a horizontal plane and extending in a first direction, and a second set of parallel tracks arranged in the horizontal plane and extending in a second direction which is orthogonal to the first direction, wherein the first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; and wherein each of the plurality of remotely operated vehicles further comprises first and second sets of wheels for transport in the first direction and the second direction on the rail system.

7. A method of verifying a detected heat or fume indication on an automated storage and retrieval system comprising:
operating a master control system that keeps track of a plurality of remotely operated vehicles operating in the automated storage and retrieval system;
receiving, by the master control system, data from a first fire detection device of a first remotely operated vehicle of the plurality of remotely operated vehicles;
determining, by the master control system, that the data from the first fire detection device at a first position indicates a detected heat or fume emission;
allocating, by the master control system, a second remotely operated vehicle with a second fire detection device to move to a second position nearby the first position of the first remotely operated vehicle indicating the detected heat or fume emission to verify the detected heat or fume emission,
based on the second remotely operated vehicle providing data from the second fire detection device to the master control system indicating a presence of heat or fume emission, allocating, by the master control system, a third remotely operated vehicle with a third fire detection device to move to a third position nearby the first position of the first remotely operated vehicle and the second position of the second remotely operated vehicle; and
utilizing the master control system to:
process the data from the first fire detection device and the second fire detection device and data from the third fire detection device, and based on the processing, determine whether a reasonable prediction of a location of a source of the heat or fume emission can be given; and
generate a heat map providing information in terms of a location of a fire or smoke or a current temperature or temperature profile of the heat or fume emission.

8. The method according to claim 7, wherein based on a determination that the reasonable prediction of the location of the source of the heat or fume emission can be given, utilizing the master control system to create a triangular arrangement (TA) enclosing the source of the heat or fume emission.

9. The method according to claim 7, wherein based on a determination that the reasonable prediction of the location of the source of the heat or fume emission cannot be given,
allocating a fourth remotely operated vehicle with a fourth fire detection device to move to a fourth position nearby the first, second, and third positions of the first, second, and third remotely operated vehicles; and
utilizing the master control system to process the data from the first fire detection device, the second fire detection device, and the third fire detection device, and data from the fourth fire detection device, and based on the processing determine whether a reasonable prediction of the location of a source of the heat or fume emission can be given.

10. The method according to claim 9, wherein based on a determination that the reasonable prediction of the location of the source of the heat or fume emission can be given,
utilizing the master control system to create a four-cornered polygon (PA) enclosing the source of the heat or fume emission.

11. The method according to claim 7, wherein each of the first fire detection device, the second fire detection device, and the third fire detection device is a fume or smoke detector, and wherein the data from the first fire detection device, the second fire detection device, and the third fire detection device represents a presence of fume or smoke.

12. The method according to claim 7, wherein each of the first fire detection device, the second fire detection device, and the third fire detection device is a heat detector and wherein the data from the first fire detection device, the second fire detection device, and the third fire detection device represents a presence of heat.

13. The method according to claim 7, wherein the first fire detection device, the second fire detection device, and the third fire detection device are a combination of fume or smoke detectors and heat detectors and wherein the data from the first fire detection device, the second fire detection device, and the third fire detection device represents a presence of fume or smoke or heat.

14. The method according to claim 7, wherein the method comprises, prior to the generating of the heat map providing information in terms of the location of the fire or smoke or the current temperature or temperature profile of the heat or fume emission, using a stationary fire detection device arranged in or at the automated storage and retrieval system.

15. The method according to claim 7, wherein the automated storage and retrieval system comprises a rail system comprising a first set of parallel tracks arranged in a horizontal plane and extending in a first direction, and a second set of parallel tracks arranged in the horizontal plane and extending in a second direction which is orthogonal to the first direction, wherein the first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks.

* * * * *